United States Patent [19]
Gibson

[11] Patent Number: 6,084,593
[45] Date of Patent: Jul. 4, 2000

[54] SURFACE NET SMOOTHING FOR SURFACE REPRESENTATION FROM BINARY SAMPLED DATA

[75] Inventor: Sarah F. Gibson, Arlington, Mass.

[73] Assignee: Mitsubishi Electric Information Technology Center America, Inc., Cambridge, Mass.

[21] Appl. No.: 09/079,079

[22] Filed: May 14, 1998

[51] Int. Cl.[7] .................................................. G06T 15/50
[52] U.S. Cl. ............................................. 345/426; 345/424
[58] Field of Search .................................. 345/424, 426, 345/433, 438, 422, 427, 418

[56] References Cited

U.S. PATENT DOCUMENTS

| | | | |
|---|---|---|---|
| 4,719,585 | 1/1988 | Cline et al. | 345/426 |
| 4,885,688 | 12/1989 | Crawford | 345/427 |
| 5,430,887 | 7/1995 | Hsiao | 712/12 |
| 5,559,901 | 9/1996 | Lobregt | 382/256 |
| 5,603,188 | 2/1997 | Robbin | 52/81.1 |
| 5,754,180 | 5/1998 | Kivolowitz et al. | 345/418 |

Primary Examiner—Mark K. Zimmerman
Assistant Examiner—Van Cao
Attorney, Agent, or Firm—Dirk Brinkman

[57] ABSTRACT

A system for generating a surface representation from binary sampled data includes means for iteratively smoothing the surface representation, while constraining the surface to conform to details in the surface of the binary data. Means are also provided to convert the surface representation into a form useful for polygon rendering and for volume rendering, with the subject system useable to generate a smooth surfaces for high quality rendering of objects stored as binary-sampled data.

7 Claims, 10 Drawing Sheets

○ EXTERIOR POINT
● INTERIOR POINT
✗ SURFACE NODE POINT
— SURFACE NET LINK

○ EXTERIOR POINT
● INTERIOR POINT
X SURFACE NODE POINT
— SURFACE NET LINK

○ EXTERIOR POINT
● INTERIOR POINT
✕ SURFACE NODE POINT
—— SURFACE NET LINK

SURFACE TRIANGLE

ELEMENT IN DISTANCE MAP
(WHITE: DIST=LARGE, BLACK: DIST=ZERO)

DISTANCE FROM TRIANGLE TO ELEMENT

SURFACE NET SMOOTHING FOR SURFACE REPRESENTATION FROM BINARY SAMPLED DATA

FIELD OF INVENTION

The field of the invention pertains to computer graphics, volume graphics, and scientific visualization and more specifically to the generation of smooth surface representations for objects stored in a 3D array of binary-sampled data values.

BACKGROUND OF THE INVENTION

High quality object rendering in computer graphics with shading and surface reflections requires an accurate model of object surfaces and their surface normals. However, when objects are stored in a sampled volume, as in Volume Graphics, such a description of the surface does not exist and the surface must be estimated from the sampled data. There are a number of ways to estimate surfaces from sampled data as described, for example, by A. Kaufman, in "Volume Visualization", IEEE Computer Society Press, 1991. However, according to this article, it is stated that compared with the results achieved in surface shading, volumetric shading is still rudimentary, exhibiting problems such as accuracy of the normal values, ambiguity, discretization artifacts, and aliasing. The conclusion from this article is that volume visualization still lacks a simple yet general paradigm that provides high fidelity shading for natural appearance and optimal recognition.

Volumetric data can be stored as grayscale data, where the sample values take on a range of intensities, or as binary data, where one value is given to points inside an object and a different value is given to points outside the object. Surface estimation is especially hard for binary sampled data because the intensity values change abruptly at object surfaces. These abrupt intensity changes result in high frequency components in the intensity data at object surfaces. High spatial frequencies mean that no sampling rate will be large enough to guarantee that the object and its surface normals can be accurately reconstructed. The result is jagged edges and aliasing artifacts in shaded volume rendered images.

Existing rendering methods that estimate surface normals from binary sampled data apply local low-pass filters to the data that remove high spatial frequencies and smooth out jagged binary surfaces. However, there are two problems with this approach. First, in addition to smoothing out the object surface, a low pass filter smoothes out important features such as cracks and thin protrusions. Second, a local filter is often not sufficient to achieve a smooth surface. This is the case, for example, when the surface is at a shallow angle to the sampling grid of the volume or when volumetric data is sampled more frequently within planar slices than between slice planes. In these cases, the object surface appears to be terraced, with planar surface regions separated by sudden elevation changes. Local filters can round out the elevation changes but they do not remove the terraces unless the filter size is as large as the width of the terrace. In medical data, where terraces can be tens of pixels wide, a local filter large enough to remove terraces would also unacceptably smooth out important detail from the rendered image.

An alternative to estimating surface normals from volume data during rendering is to reconstruct the surface as a polygonal model and render it using polygon rendering. The most common method for constructing a polygonal model from volumetric data is to use the Marching Cubes algorithm, described in "Marching Cubes: a High Resolution 3D Surface Construction Algorithm" in Proceedings for Siggraph'87, by W. Lorensen and H. Cline. While this algorithm is designed for grayscale data, it can be used to construct surfaces from binary data by low-pass filtering the data and then applying Marching Cubes to the filtered data. This technique is often used to create surface models from binary-segmented medical image data.

However, there are two problems with this approach. First, as stated above, the low-pass filtering will not remove terracing artifacts without removing significant detail from the data. Hence, the terracing artifacts show up in the polygonal model or the surface is unduly smoothed. Second, Marching Cubes produces models that contain a very large number of polygons. In order to further smooth out the surface and reduce the number of triangles in the model, the polygonal model can be smoothed and decimated using a variety of triangle reduction methods such as that described in "Decimation of Triangle Meshes", in Proceedings Siggraph'92, by W. Schroeder, W. Lorensen, and S. Linthicum. However, these methods are applied to the triangle model without considering the original binary data and can result in the elimination of important structural detail from the model.

SUMMARY OF THE INVENTION

A smooth representation of object surfaces is required in rendering so that objects appear smooth and free from artifacts. This is true both when the object is represented by a triangulated surface model and rendered with polygon rendering, and when the object is stored in a sampled volume and rendered with volume rendering. Unfortunately, when the object originates as a binary-sampled volume, achieving a smooth representation of the object surface is difficult. Binary-sampled volume data does not contain an explicit surface representation and hence the surface must be estimated from the data. However, existing methods for estimating the surface or surface normals from binary data, including local filtering methods and the Marching Cubes algorithm discussed above are subject to aliasing and terracing artifacts or excessive loss of detail.

Unlike existing techniques, the subject system creates a smooth surface representation from binary sampled data while faithfully representing details on the surface of the binary object. This is accomplished by fitting an elastic surface net over the surface and relaxing the net to smooth out its shape while constraining the surface net to follow details in the surface of the binary object.

More specifically, the first step in initializing an elastic surface net is to locate surface cubes in the volume, where a cube is a cubic region of space between eight neighboring volume elements, four each from two adjacent planes in the data volume. A surface cube is a cube for which at least one of the eight surrounding neighbors lies inside the cube and at least one of the neighbors lies outside of the object. Once surface cubes have been determined, the surface net is initialized by placing nodes at the center of each surface cube and linking nodes that lie in adjacent left, right, top, bottom, front, or back neighboring cubes in the data volume. This creates a so-called surface net of links between the nodes, initially at the centers of the cubes.

After the linked surface net has been created, the positions of individual node elements are sequentially moved to reduce the energy in the surface net. This is called relaxing the link net. In one instance, the energy is defined to be the sum of all of the link lengths and the surface net energy is reduced by moving elements to shorten the lengths of the links between nodes.

The movement of any node in the surface net is restricted so that it cannot move outside of the original surface cube containing that node, and it is this constraint which preserves the original structure during the smoothing process. This constrained relaxation is performed iteratively until the total energy in the surface net is minimized or until some user defined stopping criterion is met.

After the surface net has been smoothed in this manner, the result is a smooth representation of the binary object surface that is faithful to the original binary segmentation. The surface net representation can be converted into a form useful for polygon rendering by triangulating the surface net. Because of the existence of links between neighboring nodes, this triangulation simply involves adding selective additional links between diagonal elements in the surface net.

Alternatively, the surface net representation can be converted into a form useful for volume rendering. Such a form is a discrete map of distance values, as described in "Using Distance Maps for Accurate Surface Representation in Sampled Volumes", in Proceedings 1998 Symposium on Volume Visualization, by S. Gibson, where the closest distance to the surface is stored at each sample point in the distance map and the distance map is used to estimate surface normals during rendering.

BRIEF DESCRIPTION OF THE DRAWINGS

These and other features of the Subject Invention will be better understood in relation to the Detailed Description in conjunction with the Drawings, of which.

DETAILED DESCRIPTION

Figure 1A:
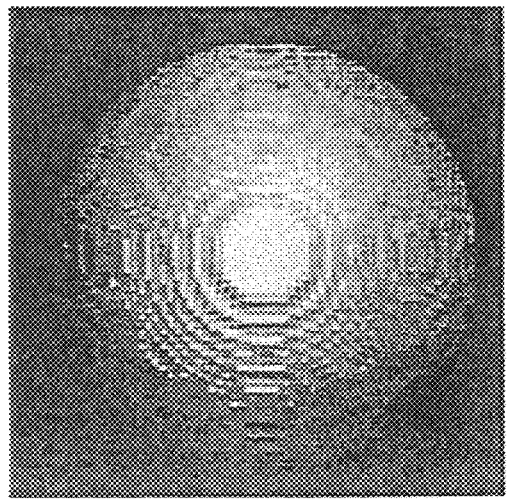
FIGS. 1A, 1B, 1C and 1D are respectively photographs of image renderings before and after the application of the subject smoothing techniques, showing the elimination of aliasing and terracing artifacts for a sphere and the bones in a knee joint without sacrifice of necessary detail.
Figure 1B:
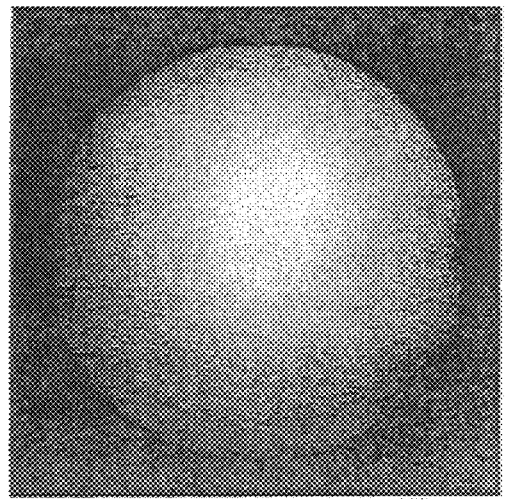
Figure 1C:
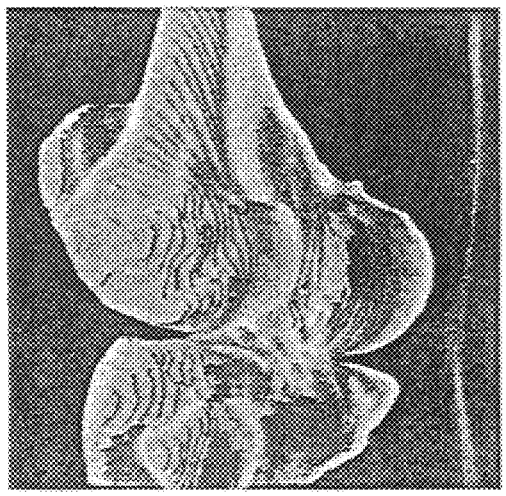
Figure 1D:
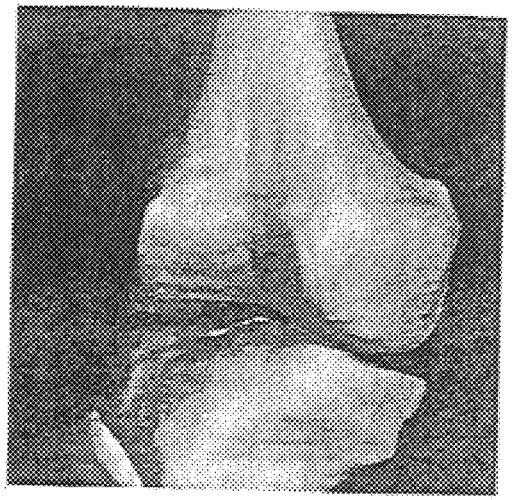

Referring now to FIGS. 1A–1D, what can be seen is that the aliasing terracing artifacts associated with prior methods of volume rendering objects stored as binary-sampled data is severe, whereas the smoothing associated with the subject technique not only smoothes the surfaces, but also, as can be seen in FIG. 1D, preserves the original surface detail. As will be seen, this is accomplished by first providing a surface net and then relaxing the net, but only insofar as certain constraints put in place to preserve detailed surface structure are not violated. In one embodiment the constraint is that a node within a surface cube cannot be moved outside the cube during the relaxation process.

Figure 2:
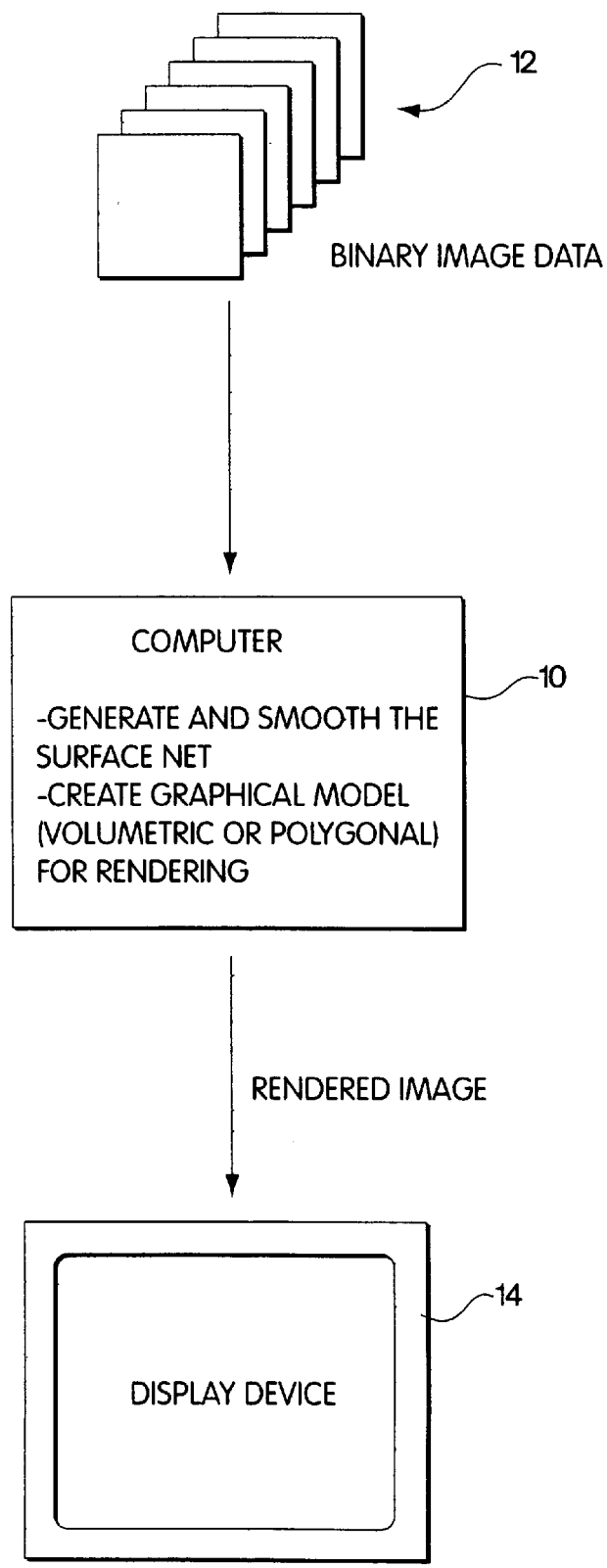
FIG. 2 is a diagrammatic representation of a generalized system for generating smooth surfaces from binary sampled data.

Referring now to FIG. 2, the subject invention comprises a method for using a computer 10 to convert binary volumetric data 12 into a smooth surface representation that can then be displayed using either polygonal rendering or volume rendering on a display device 14.

Figure 3:
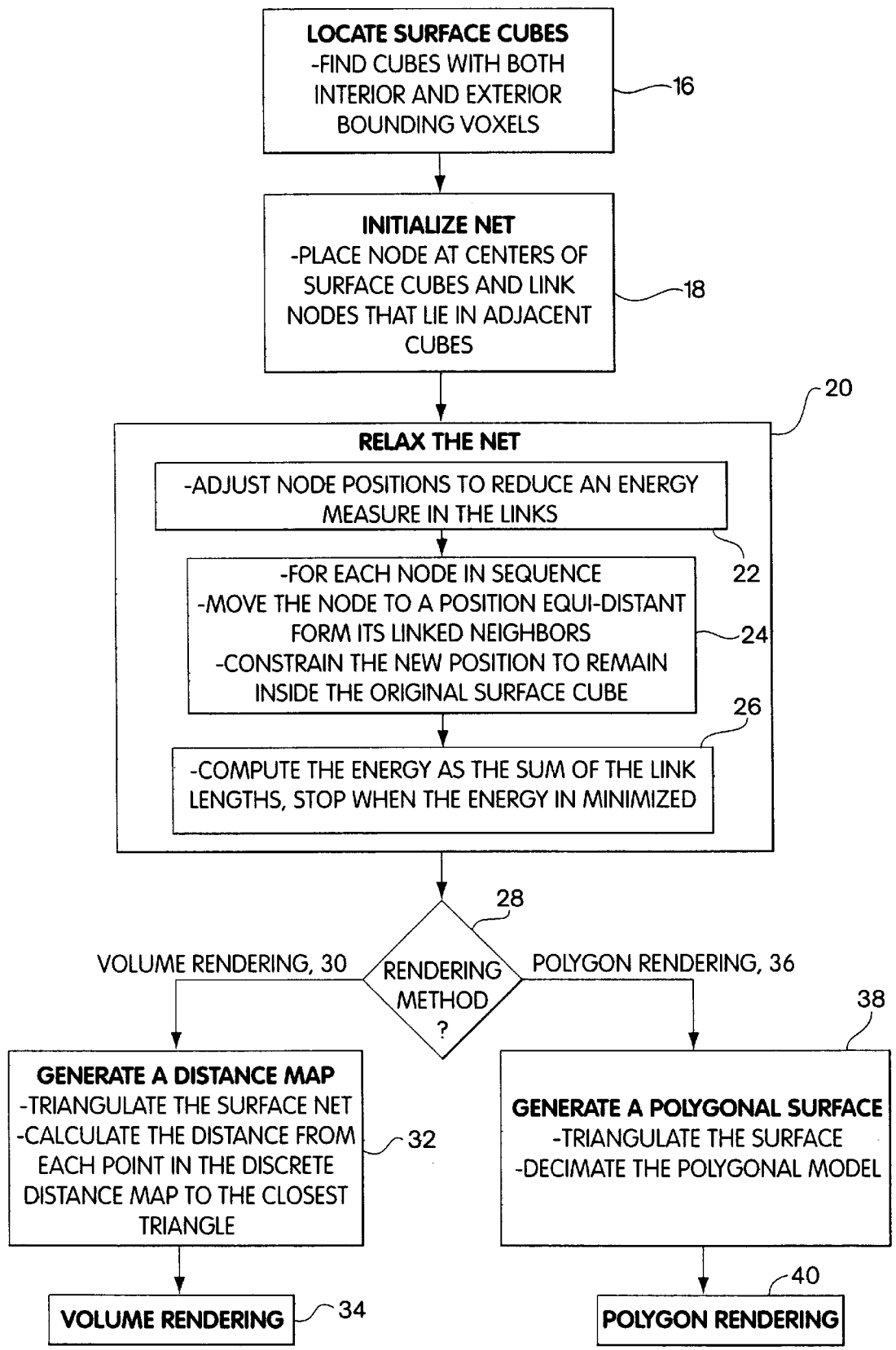
FIG. 3 is a flow chart of the surface net process for creating a smooth surface from binary sampled data and for generating a sampled volumetric distance map for volume rendering or for generating a polygonal model for polygon rendering.

How this is accomplished in one embodiment is as follows: Referring to the block diagram of FIG. 3 the surface net approach comprises: a procedure 16 for detecting surface cubes in the sampled binary data, where surface cubes are such that the at least one of the eight bounding volume elements is inside the object and at least one of the 8 bounding volume elements is outside of the object; a procedure 18 which places surface nodes at the centers of the detected surface cubes and creates links between adjacent surface nodes; a procedure 20 for relaxing the surface net, where at 22 net node positions are adjusted to reduce the energy in the net by the series of steps depicted at 24, iteratively reducing the link lengths under the constraint that net nodes must remain in their original surface cubes until, as illustrated at 26, the energy is minimized or some other stopping criteria is reached. If at 28 the rendering method is volume rendering as illulstrated at 30, then a procedure 32 triangulates the surface net and calculates the distance from each point in the distance map to the closest point on the triangulated surface and a procedure 34 volume renders the object using the distance map to estimate surface normals. If, as illustrated at 28, the rendering method is polygon rendering 36, then a procedure 38 triangulates the surface net and decimates the triangulated model and a procedure 40 renders the polygonal model.

Figure 4A:
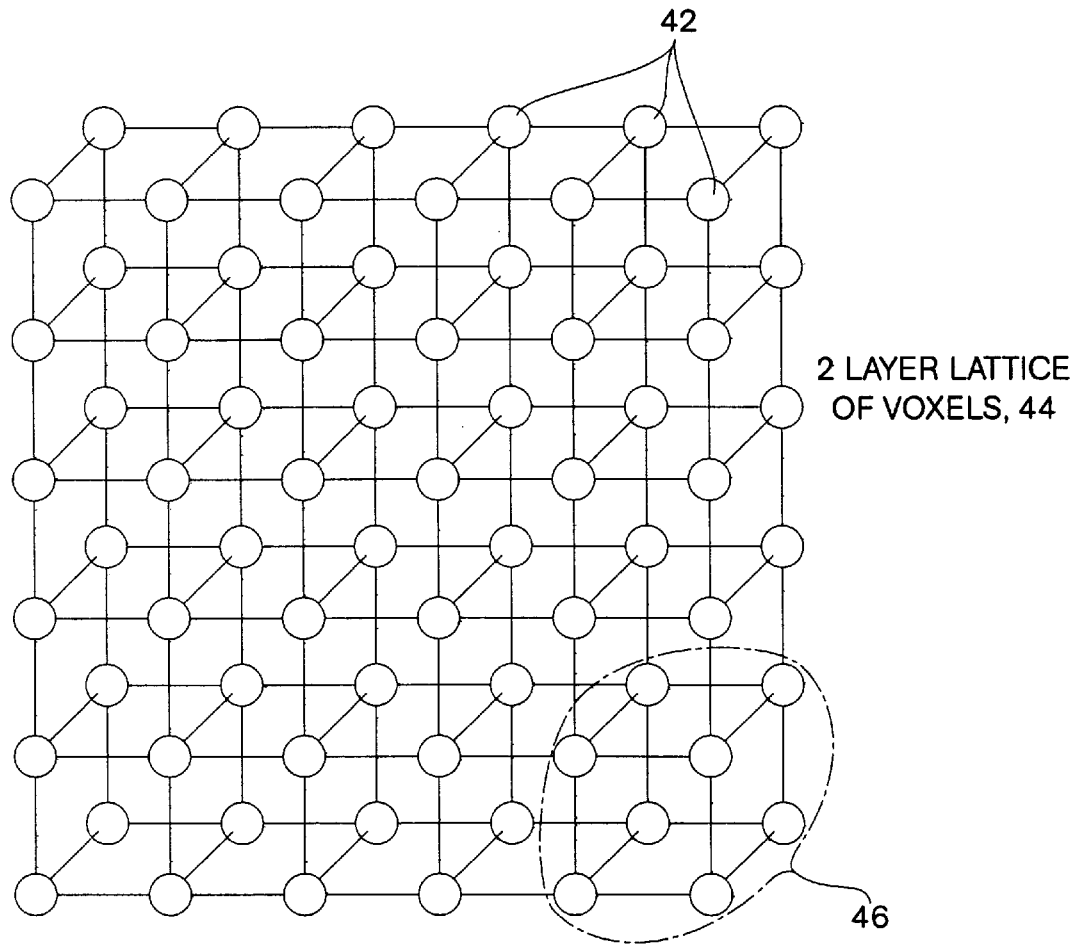
FIG. 4A is a diagrammatic representation of a 3D voxel lattice of sampled data points and a single surface cube from the lattice.
Figure 4B:
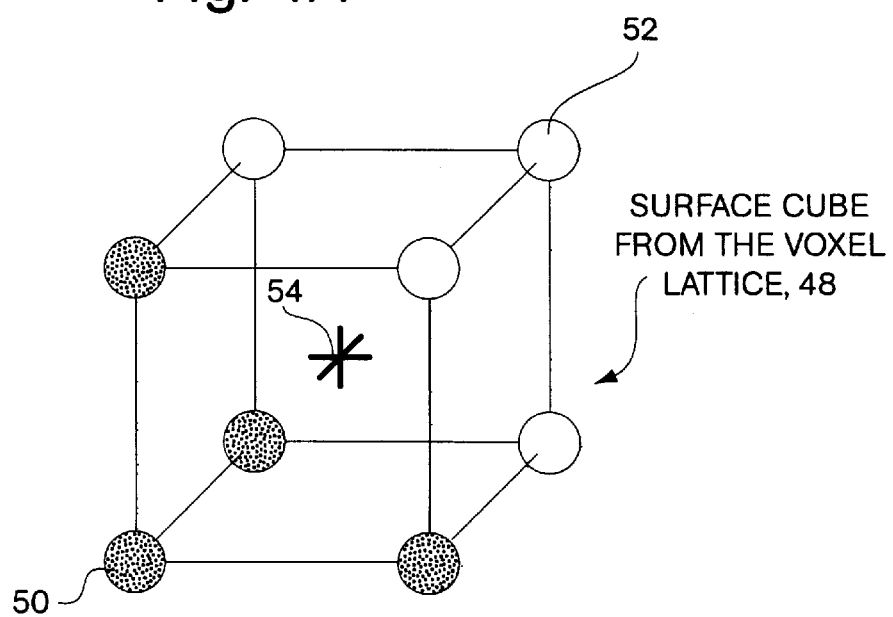
FIG. 4B is a diagrammatic representation of a surface cube of the voxel lattice showing an internal node.

Referring to FIG. 4A, in one representative example, the volumetric object consists of volume elements 42 arranged in a 3D lattice, of which 2 layers are shown at 44. A cube 46 is the space bounded by 8 neighboring volume elements, 4 each from two adjacent layers in the lattice. As shown in FIG. 4B, a surface cube 48 is a cube that contains at least one element 50 that is inside of the object and at least one element 52 that is outside of the object. A surface node 54 is initially placed at the center of each surface cube in the 3D lattice.

Figure 5:
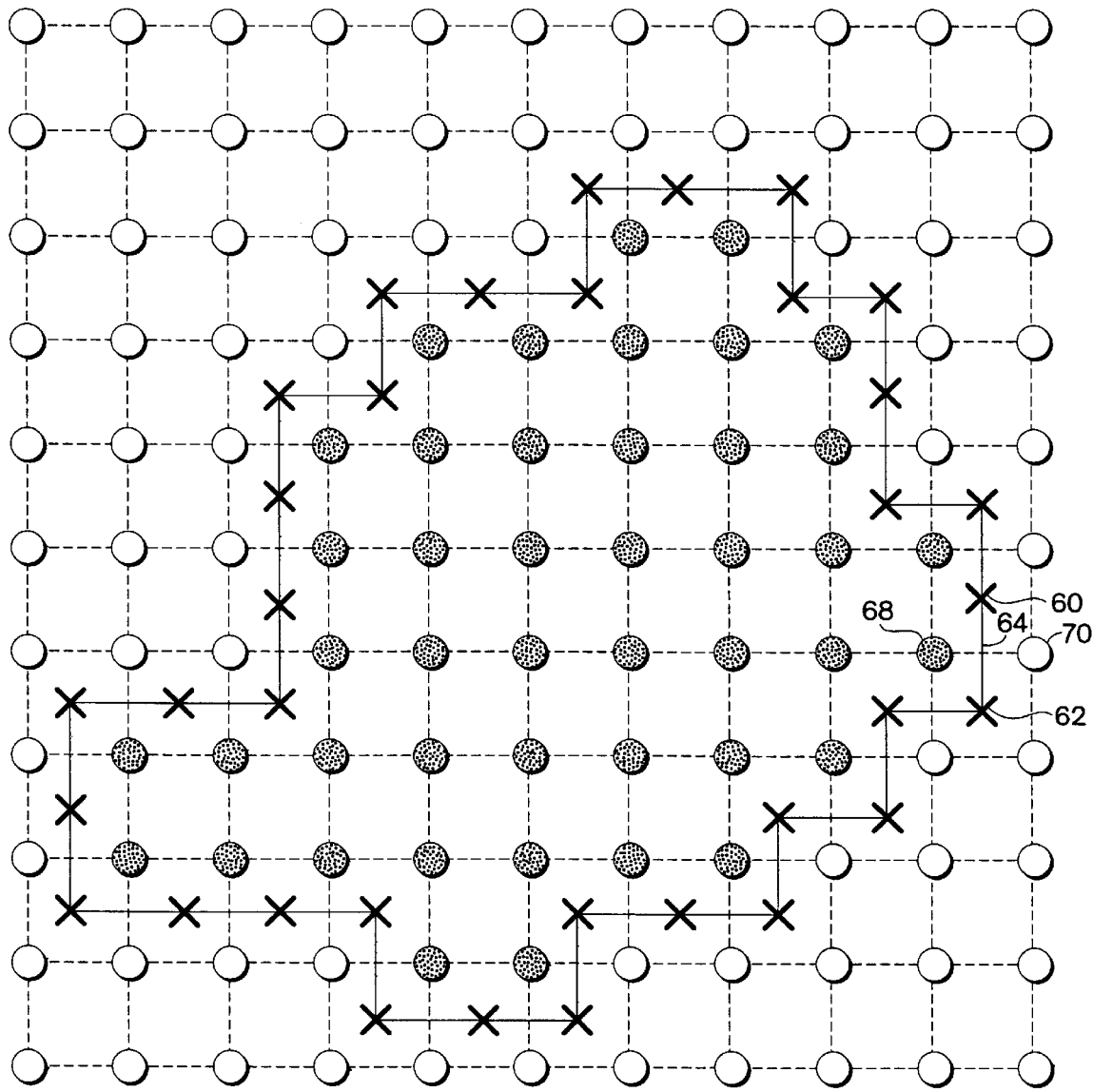
FIG. 5 is a diagrammatic representation of the initial configuration of a 2D surface net that has been fit around a 2D binary-sampled object.

Referring to FIG. 5, a 2D instance of the surface net shows the nodes 60 and 62 of the surface net, connected by a link 64. The links separate those nodes which are interior nodes of the object from those which are exterior nodes. Here link 64 separates interior node 68 from exterior node 70.

Figure 6A:
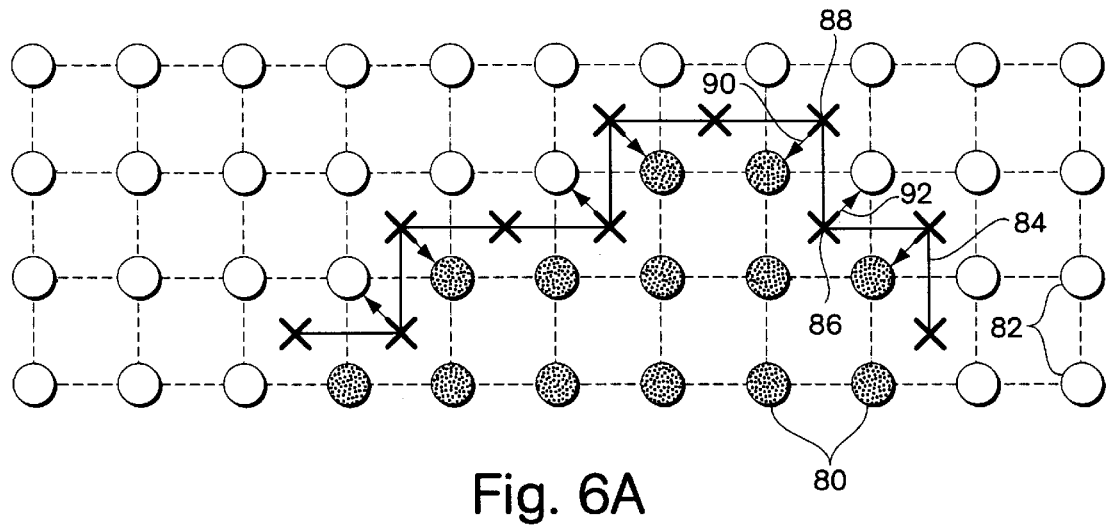
FIGS. 6A–6C are diagrammatic representations of the progressive relaxation of a 2D surface net around a portion of a 2D binary sampled object through node movement.
Figure 6B:
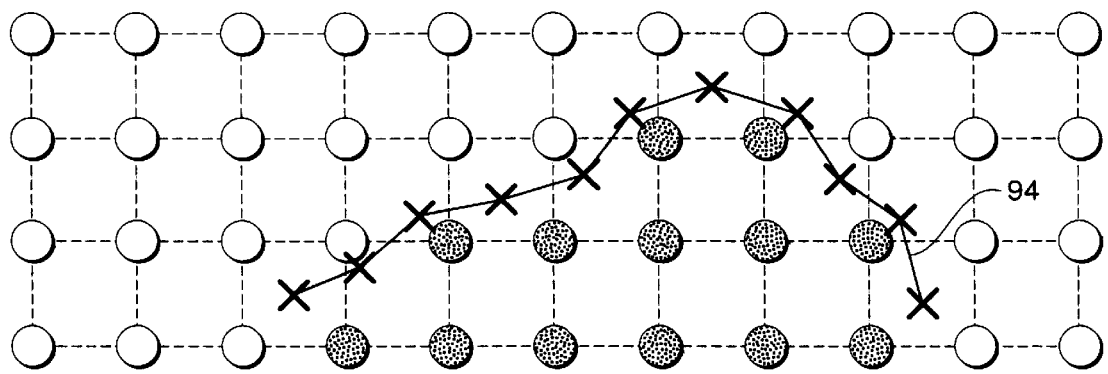

Referring to FIG. 6A, a 2D instance of a portion of a surface net shows the interior points 80 exterior points 82, the initial surface net 84 and motions of net nodes 86 and 88 towards lower energy positions 90 and 92.

Figure 6C:
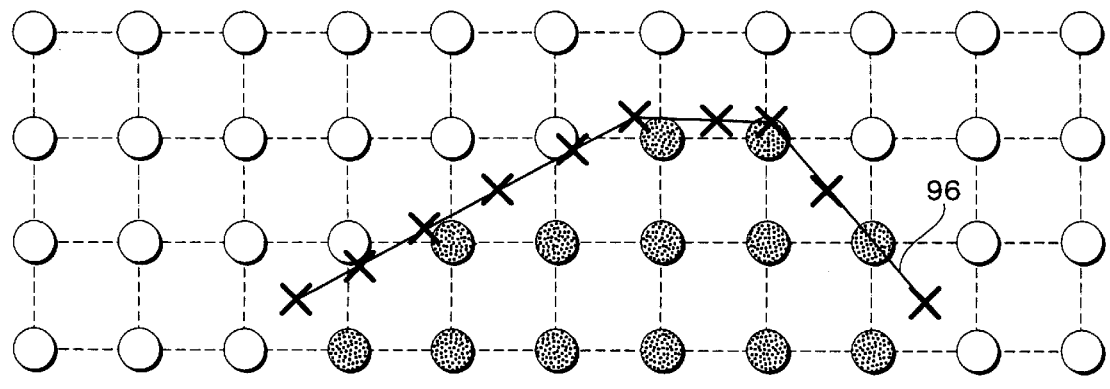

Referring to FIG. 5B, the surface net 94 has been relaxed if from its position in FIG. 6A to a lower energy state and a smoother shape. Referring to FIG. 6C, the surface net 96 has been further relaxed to a smooth shape.

Figure 7:
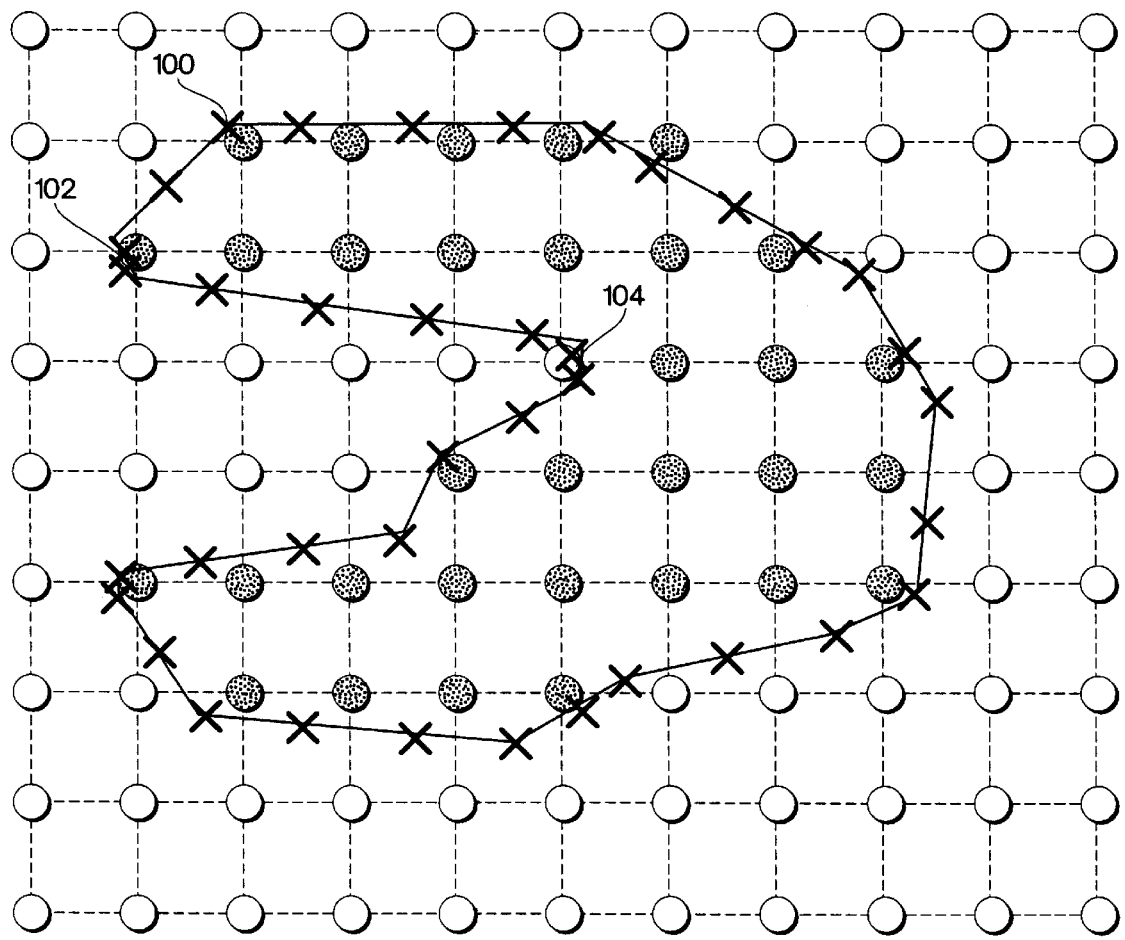
FIG. 7 is a diagrammatic representation of a relaxed surface net around a 2D object, illustrating the application of constraints to node positions.

Referring to FIG. 7, a 2D instance of the surface net shows portions 100, 102 and 104 of the surface net, where the constraint that nodes in the surface net can not move outside of their original surface cube has limited the smoothing of the object surface.

Figure 8A:
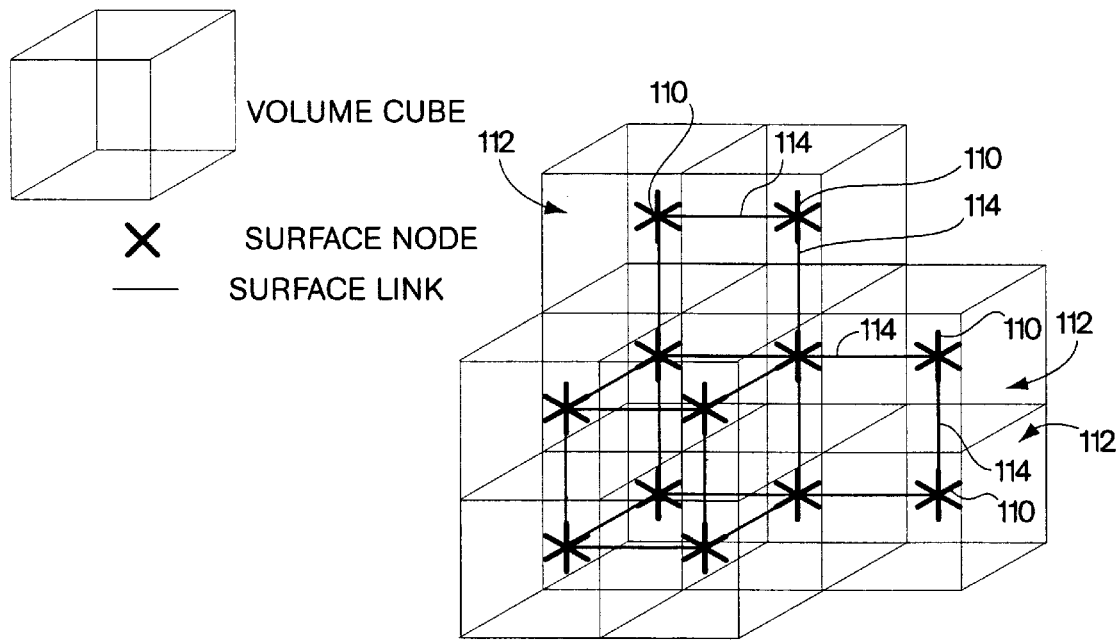
FIGS. 8A and 8B are diagrammatic representations of the relaxation of a portion of a 3D surface net from an initial surface net to a relaxed surface net.
Figure 8B:
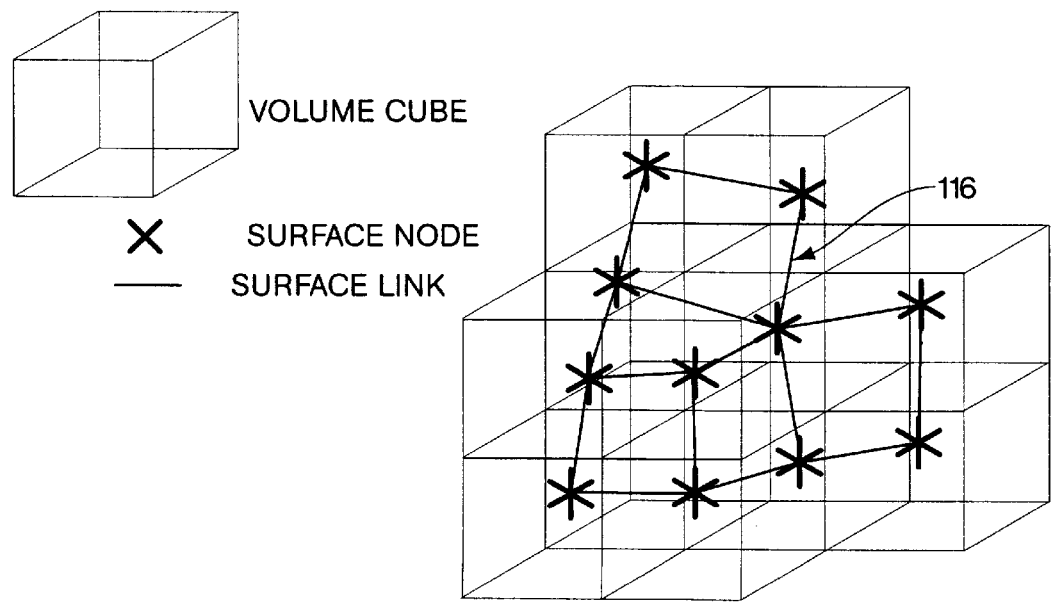

Referring to FIG. 8A, a 3D surface net is initialized so that nodes 110 lie at the centers of surface cubes 112 and links 114 join nodes in adjacent surface cubes. In FIG. 8B surface net 116 is relaxed to reduce the energy in the net by reducing the link lengths, producing a smoother surface net.

Figure 9A:
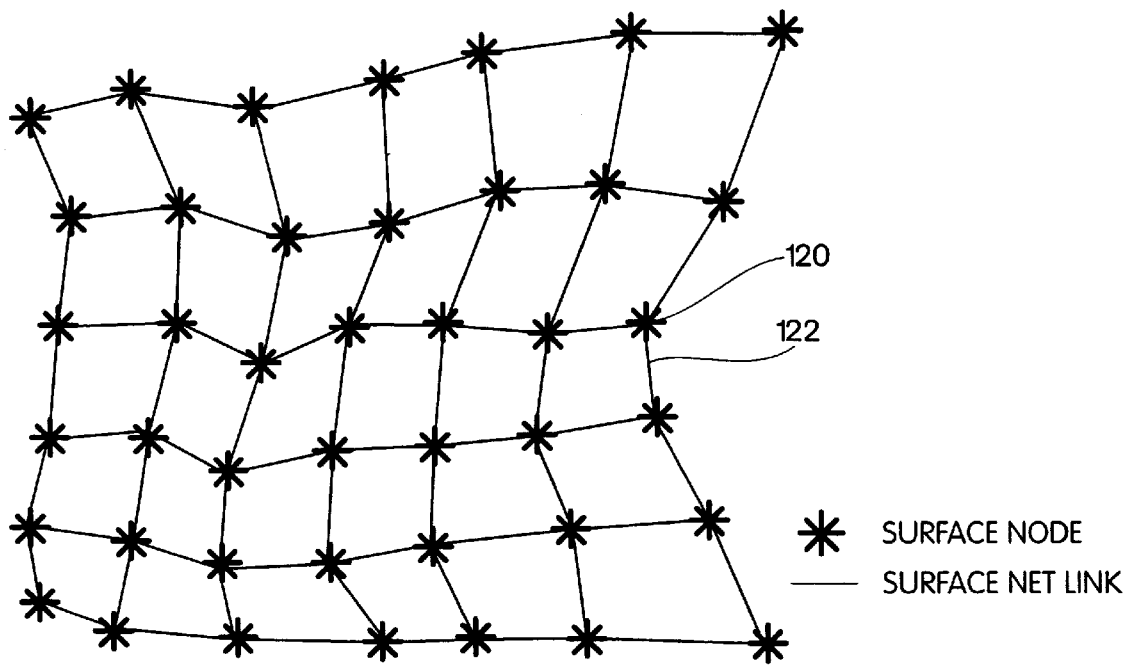
FIGS. 9A and 9B are diagrammatic representations of the triangulation of a surface net through the provision of new links as shown in FIG. 9B for the triangle surface net of FIG. 9A; and, FIG. 10 is a diagrammatic representation of the calculation of a distance map from a triangulated surface net.
Figure 9B:
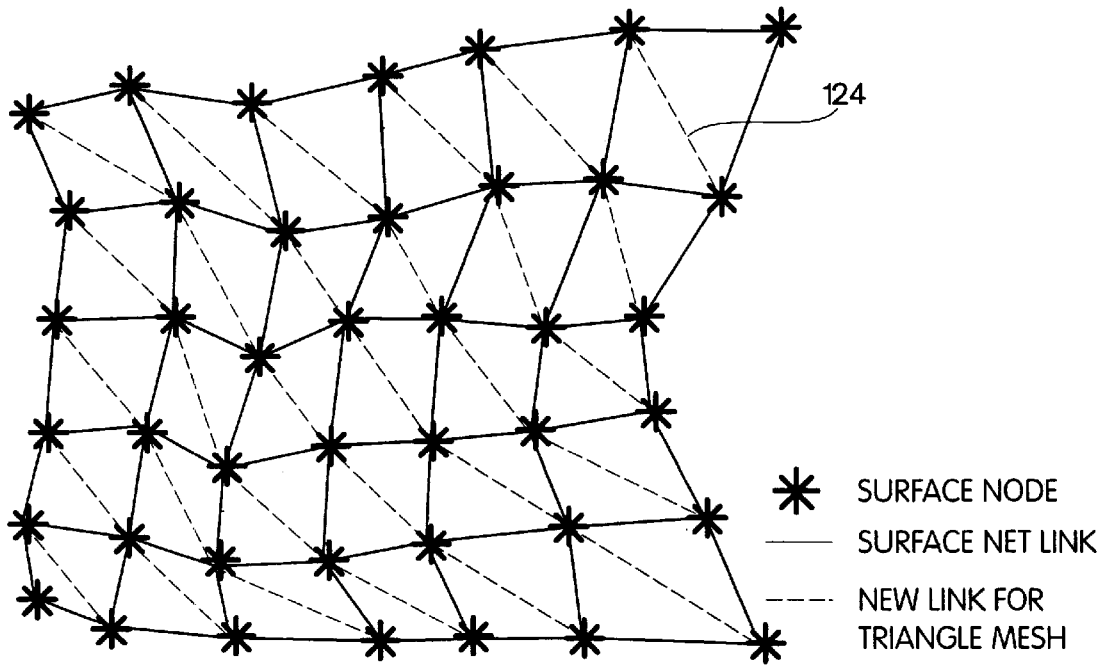

Referring to FIG. 9A, the surface net is a 3D structures consisting of surface nodes 120 and links 122. Referring to FIG. 9B, the 3D surface is triangulated by joining selective diagonal elements 124 in the surface net to create a mesh of triangular elements.

Figure 10:
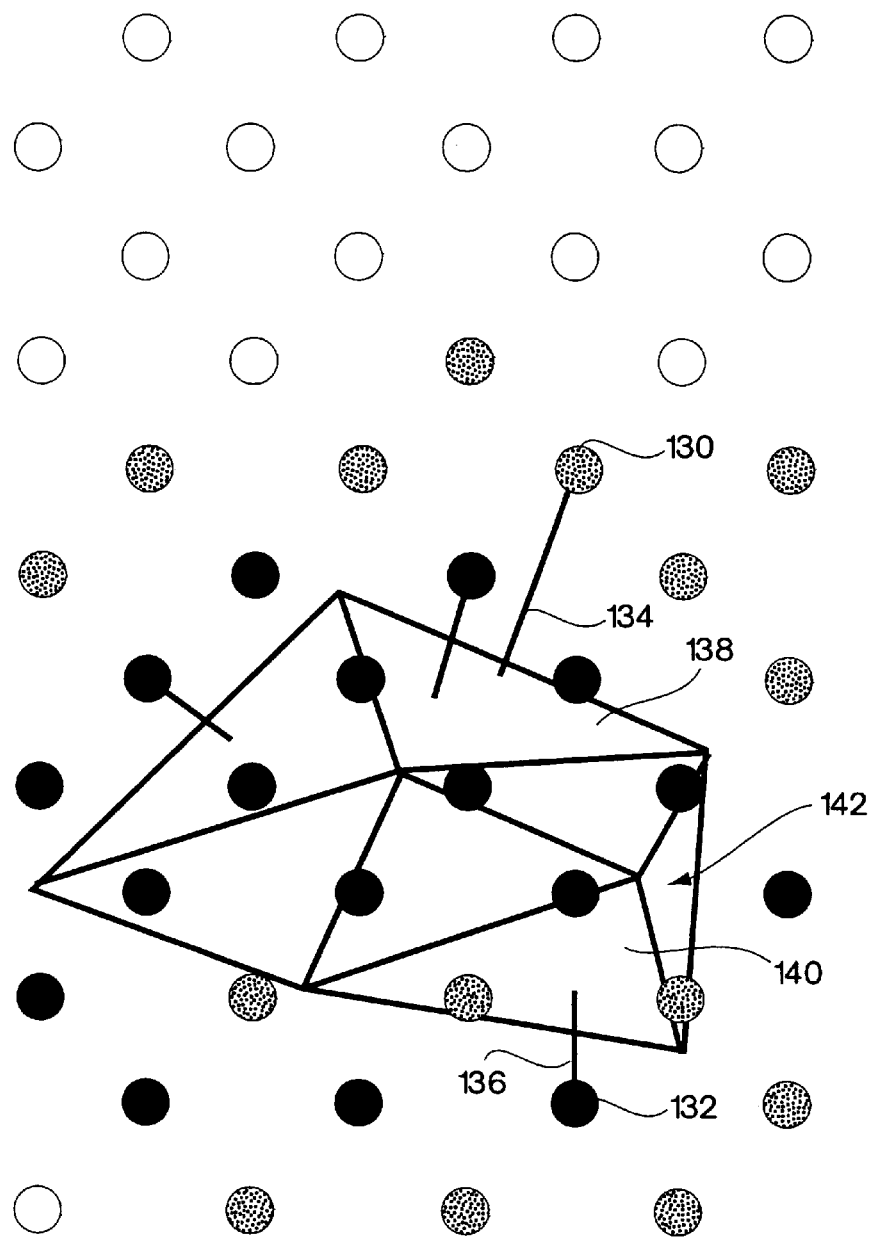
Figure 10:
Figure 10:
Figure 10:

Referring to FIG. 10, values for elements 130 and 132 in the discrete distance map, are set to the minimum distances 134 and 136 respectively from the element to triangular elements 138 and 140 respectively in surface 142.

There are several possible methods for defining the energy in the surface net and for relaxing the net to a low energy state. One such method is to define the energy as the sum of the lengths of the links between nodes in the surface net:

$$Energy = \sum_{all\ links} \|(x_1, y_1, z_1) - (x_2, y_2, z_2)\| \quad (1)$$

where $(x_1, y_1, z_1)$ and $(x_2, y_2, z_2)$ are the two nodes joined by the link, and $===v===$ indicates the magnitude of the vector, v. In this case, the energy is reduced by reducing the lengths of all of the links in the net. One way to achieve at least a local minimum of this energy is to iteratively reduce the link lengths by sequentially moving each node to a position midway between its neighboring nodes. For example, move a node n to the point:

$$(x_n, y_n, z_n) = \left( \frac{1}{N_n} \sum_{neighbor\ links} x_l, \frac{1}{N_n} \sum_{neighbor\ links} y_l, \frac{1}{N_n} \sum_{neighbor\ links} z_l \right), \quad (2)$$

where $N_n$ is the number of neighboring links for node n.

Other methods include minimizing the curvature of the surface or a combination of minimizing surface curvature and the link length.

A program listing in C is presented hereinafter to illustrate the utilization of the subject system for use in generating a distance map for volume rendering from a binary object representation using a surface net to generate a smooth representation of the object surface.

```
/* surfaceNet3D --
 *
 * Creates a linked net of surface
 * points that lie originally at the center of volume cubes with
 * 8 corner points that are not all the same (i.e. at the centers of
 * volume cubes through which the object surface passes).
 *
 * After the net is created, it is relaxed by adjusting net elements
 * to a position mid-way between neighboring net elements with the
 * constraint that the net elements must remain inside their original
 * volume cubes.
 *
 * When a satisfactory net is attained, it is used to calculate the 3D
 * volume distance map by assigning to each element in the distance map
 * the distance to the closest net point.
 *
 * The distance map is encoded into a voxel data structure that has
 * 1 byte for image intensity and 1 float for distance. The 3D voxel
 * data is output as out.dat.
 *
 * Created by S. Gibson, MERL, January, 1998.
 */
/* includes */
#include <stdlib.h>
#include <math.h>
#include <stdio.h>
#include <time.h>
#include <strings.h>
#include <fcntl.h>
#include <X11/Xlib.h>
#include <X11/X.h>
#include <X11/Xutil.h>
#include <X11/Xos.h>
#include <X11/Xatom.h>
#include <X11/Xmu/StdCmap.h>
#include <X11/keysym.h>
#include <GL/glx.h>
#include <GL/glu.h>
/* global definitions */
#define WIN_WIDTH 512
#define WIN_HEIGHT 512
/* global definitions */
#define TRUE 1
```

-continued

```
#define FALSE 0
#define byte unsigned char
#define PMODE 0644
#define OBJECT 7
#define MAX_ELEMENTS 500000
/* type definitions */
typedef struct NetElement {
    int i, j, k;
    float x, y, z;
    struct NetElement *left, *right, *top, *bottom, *front, *back;
} NetElement;
typedef struct VisVoxelStruct {
    unsigned char value;
    float dist;
} VisVoxel;
/* structure definitions */
typedef struct VisFVectorStruct {
    float x, y, z;
} VisFVector;
/* global variables */
int filedes;
Window win;
Display *dpy;
Atom wmDeleteWindow;
GLboolean doubleBuffer = GL_TRUE, iconic = GL_FALSE, keepAspect = GL_FALSE;
XSizeHints sizeHints = {0};
GLdouble bodyWidth = 2.0;
int configuration[ ] = (GLX_DOUBLEBUFFER, GLX_RGBA, GLX_DEPTH_SIZE, 16, None);
/* function definitions */
int MkNet(byte *object, NetElement* *occMap, int xSize, int ySize, int zSize,
                NetElement *net);
void addElement(byte *object, NetElement* *occMap, int xSize, int ySize,
                        int zSize, NetElement *net, int i, int j, int k,
                        int iElement);
float RelaxNet(NetElement *net, int nElements, float scale);
void MkDistMap(byte *object, NetElement *net, int nElements,
                        int xSize, int ySize, int zSize);
void DrawNet(NetElement *net; int nElements, byte *object,
                        int xSize, int ySize, int zSize);
Colormap getTrueColorColorMap(XVisualInfo * vi);
void initialize_display( );
void AddTriangleToDistMap(VisFVector v0, VisFVector v1, VisFVector v2,
                                        VisVoxel *data, int xSize, int ySize, int zSize,
                                        int filterSize);
int setDist(int i, int j, int k, int xSize, int ySize, int zSize,
                        VisFVector v0, VisFVector v1, VisFVector v2, VisVoxel *data);
float DistFromTriangle(VisFVector p, VisFVector v0, VisFVector v1,
                                        VisFVector v2);
VisFVector CrossProduct (VisFVector v1, VisFVector v2);
float DotProduct (VisFVector v1, VisFVector v2);
VisFVector ScalarMult(float k, VisFVector v1);
VisFVector VectorDiff(VisFVector v1, VisFVector v2);
float VectorMag(VisFVector v);
VisFVector VectorNorm(VisFVector v);
main(int argc, char **argv)
{
    byte *data;
    byte *object;
    int i, j, k, index;
    int dataXSize, dataYSize, dataZSize;
    int xSize, ySize, zSize, size;
    int minX, maxX, minY, maxY, minZ, maxZ;
    int nElements, nRelax;
    int type;
    int stop;
    int fd, n;
    float oldEnergy, energy;
    float scale;
    NetElement *net;
    NetElement* *occMap;                    /* contains pointers to net elements */
    XEvent event, ahead;
    Window window;
    /* 1) get the input arguments */
    if (argc != 6) {
        fprintf (stdout,
                        "USAGE: surfaceNet2D filename xSize ySize zSize type\n");
        exit(0)
    }
    sscanf(argv[2], "%d", &dataXSize);
```

```
sscanf(argv[3], "%d", &dataYSize);
sscanf(argv[4], "%d", &dataZSize);
sscanf(argv[5], "%d", &type);
size = dataXSize * dataYSize * dataZSize;
if (!(data = (byte *) malloc(size * sizeof(byte))) ) {
    fprintf(stderr, "malloc: allocation failure for object \n");
    exit(1);
}
if ((fd = open(argv[1], O_RDONLY)) == -1) {
    fprintf (stderr, "can't open file %s \n", argv[1]);
    exit (1);
}
if((n = read(fd, data, size * sizeof(byte))) != size * sizeof(byte)) {
    fprintf (stderr, "error reading data file %s \n", argv[1]);
    exit(1);
}
minX = dataXSize; minY = dataYSize; minZ = dataZSize;
maxX = maxY = maxZ = 0;
index = 0;
for (k = 0; k < dataZSize; k++)
    for (j = 0; j < dataYSize; j++)
        for (i = 0; i < dataXSize, i++) {
            if (data[index] == type) {
                if (i < minX) minX = i;
                if (j < minY) minY = j;
                if (k < minZ) minZ = k;
                if (i > maxX) maxX = i;
                if (j > maxY) maxY = j;
                if (k > maxZ) maxZ = k;
            }
            index++;
        }
if ((maxX < minX)|| (maxY < minY) || (maxZ < minZ)) {
    fprintf (stderr, "Fatal Error: no object %d present \n", type);
    exit(0);
}
minX -= 5; minY -= 5; minZ -= 5;
maxX += 5; maxY += 5; maxZ += 5;
xSize = maxX - minX + 1;
ySize = maxY - minY + 1;
zSize = maxZ - minZ + 1;
size = xSize*ySize*zSize;
if (!(object = (byte *) malloc(size * sizeof(byte))) ) {
    fprintf(stderr, "malloc: allocation failure for object \n");
    exit(1);
}
for (i = 0; i < size; i++) {
    object[i] = 0;
}
for (k = minZ+5; k <= maxZ-5; k++) {
    for (j = minY+5; j <= maxY-5; j++)
        for (i = minX+5; i <= maxX-5; i++) {
            if (data[i + j*dataXSize + k*dataXSize*dataYSize] == type) {
                index = i-minX + (j-minY)*xSize + (k-minZ) *xSize*ySize;
                object[index] = 1;
            }
        }
}
free (data);
if (!(net = (NetElement *) malloc(MAX_ELEMENTS * sizeof(NetElement))) ) {
    fprintf(stderr, "malloc: allocation failure for surface net \n");
    exit(1);
}
if (!(occMap = (NetElement **) malloc(size*sizeof(NetElement*))) ( {
    fprintf(stderr, "malloc: allocation failure for surface net \n");
    exit(1);
}
for (i = 0; i < size; i++)
    occMap[i] = NULL;
for (i = 0; i < MAX_ELEMENTS; i++) {
    net[i].left = net[i].right = net[i].top = net[i].bottom =
        net[i].front = net[i].back = NULL;
}
nElements = MkNet(object, occMap, xSize, ySize, zSize, net);
initialize_display ( );
glClear(GL_COLOR_BUFFER_BIT);
DrawNet(net, nElements, object, xSize, ySize, zSize);
scale = 1.0;
stop = FALSE;
```

```
        while (stop == FALSE) {
            xNextEvent[dpy, &event);
            switch (event.type) {
            case KeyPress:
                if ((XLookupKeysym((XKeyEvent *) & event, 0) == XK_Return)) {
                    energy = RelaxNet(net, nElements, scale);
                    glClear (GL_COLOR_BUFFER_BIT);
                    DrawNet(net, nElements, object, xSize, ySize, zSize);
                }
                else if ((XLookupKeysym((XKeyEvent *) & event, 0) == XK_Escape)) {
                    fprintf (stderr, "exit relaxation \n");
                    exit(0);
                }
                else if ((XLookupKeysym((XKeyEvent *) & event, 0) == XK_s)) {
                    stop = TRUE;
                }
                break;
            }
        }
        MkDistMap(object, net, nElements, xSize, ySize, zSize);
        free(object);
        free(net);
        free(occMap);
}
    /* MkNet --
     *
     * Creates net of linked elements on the surface of a 3D bitmap. Each element
     * contains an index position, an (x, y, z) position and pointers to possible
     * neighboring elements. These pointers will be NULL if the corresponding
     * neighbor is not an surface element or the address of the appropriate
     * surface neighbor.
     * Surface elements lie in cubes with at least one different corner value.
     * Original element positions are at the center of the indexed surface
     * cube.
     */
int MkNet(byte *object, NetElement* *occMap, int xSize, int ySize, int zSize,
                            NetElement *net)
        int i, j, k, index;
        int found = 0;
        int nElements = 0;
        for (k = 0; k < zSize-1; k++) {
            for (j = 0; j < ySize-1; j++) {
                for (i = 0; i < xSize-1; i++) {
                    index = i + j*xSize +k*xSize*ySize;
                    if (!((object[index] == object[index+1]) &&
                                    (object[index] == object[index+xsize]) &&
                                    (object[index] == object[index+1+xSize]) &&
                                    (object[index] == object[index+xSize*ySize]) &&
                                    (object[index] == object[index+1+xSize*ySize]) &&
                                    (object[index] == object[index+xSize+xSize*ySize]) &&
                                    (object[index] == object[index+1+xSize+xSize*ySize]))) {
                        addElement(object, occMap, xSize, ySize, zSize, net, i, j, k,
                                                nElements);
                        nElements++;
                        if (nElements >= MAX_ELEMENTS) {
                            fprintf (stderr, "Warning max elements exceeded \n");
                            i = xSize; j = ySize; k = zSize;
                        }
                    }
                }
            }
        }
}
for (i = 0; i < nElements; i++) {
    index = net[i].i + net[i].j*xSize + net[i].k*xSize*ySize;
    if ((net[i].i < xSize-1) && (occMap[index+1] != NULL))
        net[i].right = occMap[index+1];
    if ((net[i].i > 0) && (occMap[index-1] != NULL))
        net[i].left = occMap[index-1];
    if ((net[i].j < ySize-1) && (occMap[index+xSize] != NULL))
        net[i].top = occMap[index+xSize];
    if ((net[i].j > 0) && (occMap[index-xSize] != NULL))
        net[i].bottom = occMap[index-xSize];
    if ((net[i].k < zSize-1) && (occMap[index+xSize*ySize] != NULL))
        net[i].back = occMap[index+xSize*ySize];
    if ((net[i].k >0) && (occMap[index-xSize*ySize] != NULL))
        net[i].front = occMap[index-xSize*ySize];
    }
    return nElements;
}
```

```
        /* addElement --
         *
         * Recursively add new elements until list is filled.
         */
void addElement(byte *object, NetElement* *occMap, int xSize, int ySize,
                                int zSize, NetElement *net, int *i, int j, int k,
                                int iElement)
{
        net[iElement].i = i;
        net[iElement].j = j;
        net[iElement].k = k;
        net[iElement].x = (float) (i + 0.5);
        net[iElement].y = (float) (j + 0.5);
        net[iElement].z = (float) (k + 0.5);
        occMap[i + j*xSize + k*xSize*ySize] = &(net[iElement]);
        return;
}
        /* RelaxNet --
         *
         * Relaxes the positions of net elements so that the total energy of the net
         * is reduced but elements remain within their original indexed surface
         * squares.
         */
float RelaxNet(NetElement *net, int-nElements, float scale)
{
        int i, nNeighbors;
        float x, y, z;
        float dx, dy, dz;
        float energy = 0;
        for (i = 0; i < nElements; i++) {
                nNeighbors = 0;
                x = y = z = 0;
                if (net[i].left != NULL) {
                        x += net[i].left->x;
                        y += net[i].left->y;
                        z += net[i].left->z;
                        nNeighbors++;
                }
                if (net[i].right != NULL) {
                        x += net[i].right->x;
                        y += net[i].right->y;
                        z += net[i].right->z;
                        nNeighbors++;
                }
                if (net[i].top != NULL) {
                        x += net[i].top->x;
                        y += net[i].top->y;
                        z += net[i].top->z;
                        nNeighbors++;
                }
                if (net[i].bottom != NULL) {
                        x += net[i].bottom->x;
                        y += net[i],bottom->y;
                        z += net[i],bottom->z;
                        nNeighbors++;
                }
                if (net[i].front != NULL) {
                        x += net[i].front->x;
                        y += net[i].front->y;
                        z += net[i].front->z;
                        nNeighbors++;
                }
                if (net[i].back != NULL) {
                        x += net[i].back->x;
                        y += net[i].back->y;
                        z += net[i].back->z;
                        nNeighbors++;
                }
                if (nNeighbors > 0) {
                        dx = x / (float) nNeighbors - net [i].x;
                        dy = y / (float) nNeighbors - net[i].y;
                        dz = z / (float) nNeighbors - net[i].z;
                        net[i].x += scale * dx;
                        net[i].y += scale * dy;
                        net[i].z += scale * dz;
                        if (net[i].x < net[i].i) {
                                net[i].x = net[i].i;
                        }
                        else if (net[i].x > net[i].i + 1) {
```

-continued

```
                    net[i].x = net[i].i +1;
                }
                if (net[i].y < net[i].j) {
                    net [i].y = net[i].j;
                }
                else if (net[i].y > net[i].j + 1) {
                    net[i].y = net[i].j + 1;
                }
                if (net[i].z < net[i].k) {
                    net[i].z = net[i].k;
                }
                else if (net[i].z > net[i].k + 1) {
                    net[i].z = net[i].k + 1;
                }
            }
            energy += dx*dx + dy*dy + dz*dz;
    }
    return energy;
}
/* MkDistMap --
 *
 * Makes a distance map of the same dimension as the original data
 * using the surface net and a modified central-point distance filter,
 * fills interior points with 1's and writes the voxel data to out.dat.
 *
 */
void MkDistMap(byte *object, NetElement *net, int nElements,
                                int xSize, int ySize, int zSize)
{
    byte *distImg;
    int i, j, k, index;
    int ii, jj, kk;
    int minI, maxI, minJ, maxJ, minK, maxK;
    int dataI, dataJ, dataK;
    int iElement;
    int planeSize, size;
    int filterSize = 5;
    int fd, n;
    int nTriangles;
    double temp, x, y, z;
    float *dist;
    VisVoxel *data;
    VisFVector v0, v1, v2;
    planeSize = xSize*ySize;
    size = xSize*ySize*zSize;
    if (! (data = (VisVoxel *) malloc(size * sizeof(VisVoxel))) ) {
        fprintf(stderr, "malloc: allocation failure for output voxel data \n");
        exit(1);
    }
    if (! (dist = (float *) malloc(size * sizeof(float))) ) {
        fprintf(stderr, "malloc: allocation failure for distance data \n");
        exit(1);
    }
    if (! (distImg = (byte *) malloc(size * sizeof(byte))) ) {
        fprintf(stderr, "malloc: allocation failure for distance data \n");
        exit(1);
    }
    index = 0;
    for (k = 0; k < zSize; k++)
        for (j = 0; j < ySize; j++)
            for (i = 0; i < xSize; i++) {
                if (object[index] == 1) {
                    data[index].dist = filterSize;
                    data[index].value = 1;
                }
                else {
                    data[index].dist = -filterSize;
                    data[index].value = 0;
                }
                index++;
            }
    nTriangles = 0;
    for (i = 0; i < nElements; i++{
        v0.x = net[i].x;
        v0.y = net[i].y;
        v0.z = net[i].z;
        if (net[i].left != NULL) {
            v1.x = net[i].left->x;
            v1.y = net[i].left->y;
```

```
            v1.z = net[i].left->z;
            if (net[i].top != NULL) {
                v2.x = net[i].top->x;
                v2.y = net[i].top->y;
                v2.z = net[i].top->z;
                AddTriangleToDistMap(v2, v0, v1, data, xSize, ySize, zSize,
                                                filterSize);
                nTriangles++;
            }
            if (net[i].bottom != NULL) {
                v2.x = net[i].bottom->x;
                v2.y = net[i].bottom->y;
                v2.z = net[i].bottom->z;
                AddTriangleToDistMap(v1, v0, v2, data, xSize, ySize, zSize,
                                                filterSize);
                nTriangles++;
            }
            if (net[i].front != NULL) {
                v2.x = net[i].front->x;
                v2.y = net[i].front->y;
                v2.z = net[i].front->z;
                AddTriangleToDistMap(v1, v0, v2, data, xSize, ySize, zSize,
                                                filterSize);
                nTriangles++;
            }
            if (net[i].back != NULL) {
                v2.x = net[i].back->x;
                v2.y = net[i].back->y;
                v2.z = net[i].back->z;
                AddTriangleToDistMap(v2, v0, v1, data, xSize, ySize, zSize,
                                                filterSize);
                nTriangles++;
            }
        }
        if (net[i].right != NULL) {
            v1.x = net[i].right->x;
            v1.y = net[i].right->y;
            v1.z = net[i].right->z;
            if (net[i].top != NULL) {
                v2.x = net[i].top->x;
                v2.y = net[i].top->y;
                v2.z = net[i].top->z;
                AddTriangleToDistMap(v1, v0, v2, data, xSize, ySize, zSize,
                                                filterSize);
                nTriangles++;
            }
            if (net[i].bottom != NULL) {
                v2.x = net[i].bottom->x;
                v2.y = net[i].bottom->y;
                v2.z = net[i].bottom->z;
                AddTriangleToDistMap(v2, v0, v1, data, xSize, ySize, zSize,
                                                filterSize);
                nTriangles++;
            }
            if (net[i].front != NULL) {
                v2.x = net[i].front->x;
                v2.y = net[i].front->y;
                v2.z = net[i].front->z;
                AddTriangleToDistMap(v2, v0, v1, data, xSize, ySize, zSize,
                                                filterSize);
                nTriangles++;
            }
            if (net[i].back != NULL) {
                v2.x = net[i].back->x;
                v2.y = net[i].back->y;
                v2.z = net[i].back->z;
                AddTriangleToDistMap(v1, v0, v2, data, xSize, ySize, zSize,
                                                filterSize);
                nTriangles++;
            }
        }
        if (net[i].top != NULL) {
            v1.x = net[i].top->x;
            v1.y = net[i].top->y;
            v1.z = net[i].top->z;
            if (net[i].front != NULL) {
                v2.x = net[i].front->x;
                v2.y = net[i].front->y;
                v2.z = net[i].front->z;
```

```
                    AddTriangleToDistMap(v1, v0, v2, data, xSize, ySize, zSize,
                                    filterSize);
                    nTriangles++;
                }
                if (net[i].back !=NULL) {
                    v2.x = net[i].back->x;
                    v2.y = net[i].back->y;
                    v2.z = net[i].back->z;
                    AddTriangleToDistMap(v2, v0, v1, data, xSize, ySize, zSize,
                                    filterSize);
                    nTriangles++;
                }
            }
        }
        if (net[i].bottom != NULL) {
            v1.x = net[i].bottom->x;
            v1.y = net[i].bottom->y;
            v1.z = net[i].bottom->z;
            if (net[i].front != NULL) {
                v2.x = net[i].front->x;
                v2.y = net[i].front->y;
                v2.z = net[i].front->z;
                AddTriangleToDistMap(v2, v0, v1, data, xSize, ySize, zSize,
                                filterSize);
                nTriangles++;
            }
            if (net[i].back != NULL) {
                v2.x = net[i].back->x;
                v2.y = net[i].back->y;
                v2.z = net[i].back->z;
                AddTriangleToDistMap(v1, v0, v2, data, xSize, ySize, zSize,
                                filterSize);
                nTriangles++;
            }
        }
    }
    /* low pass filter the distance field */
    /*
    for (k = 2; k < zSize - 2; k++)
        for (j = 2; j < ySize - 2; j++)
            for (i = 2; i < xSize - 2, i++) {
                index = i + j*xSize + k*planeSize;
                dist[index] = 0;
                for (kk = -2; kk < 2, kk++)
                    for (jj = -2; jj <= 2, jj++)
                        for (ii = -2, ii <= 2; ii++) {
                            dist[index] += data[index + ii + jj*xSize + kk*planeSize].dist;
                        }
                index++;
            }
    for (k = 1; k < zSize - 1; k++)
        for (j = 1; j < ySize - 1, j++)
            for (i = 1; i < xSize - 1; i++) {
                index = i + j *xSize + k*planeSize;
                data[index].dist = dist[index];
            }
    if ((fd = creat("dist.raw", PMODE)) == -1) {
        fprintf (stderr, "can't create file dist.raw \n");
        exit(0);
    }
    if ((n = write(fd, distImg, xSize*zSize*sizeof(byte))) !=
            xSize*zSize*sizeof (byte)) {
        fprintf(stderr, "cannot write dist image to output file dist.raw \n");
        exit(0);
    }
    close(fd);
    /* open output file, write data into output file, close output file */
    if ((fd = creat("out.dat", PMODE)) == -1) {
        fprintf (stderr, "can't create file out.dat \n");
        exit(0);
    }
    if ((n = write(fd, data, size*sizeof(VisVoxel))) != size*sizeof(VisVoxel)) {
        fprintf(stderr, "cannot write image to output file out.dat \n");
        exit(0);
    }
    close(fd);
    free(data);
    free(dist);
    free(distImg);
    return;
```

-continued

```
}
      /* DrawNet --
       *
       * Draw the elements and links to their neighbors.
       */
void DrawNet(NetElement *net, int nElements, byte *object,
                              int xSize, int ySize, int zSize)
{
        int i, j, k;
        int nTriangles;
        float x, y, z, x1, y1, z1, x2, y2, z2;
        float zOffset;
        float xScale, yScale, zScale;
        xScale= 1.5 / xSize;
        yScale= 1.5 / ySize;
        zScale= 1.5 / zSize;
        glColor3f(1.0, 0.0, 0.0);
        glPointSize(1.0);
        glBegin(GL_POINTS);
        glBegin(GL_POINTS);
        for (i = 0; i < nElements; i++) {
                if ((net[i].j == 100) || (net[i].j == 105) || (net[i].j == 110)) {
                        glColor3f(1.0, 0.0, 0.0);
                        x = (net[i].x - xSize/2.0) * xScale;
                        y = (net[i].z - zSize/2.0) * zScale;
                        glVertex2f(x, y);
                }
                if (net[i].k == 33) {
                        glColor3f(1.0, 0.0, 0.0);
                        zOffset = (net[i].k - zSize/2.0) * zScale;
                        z = (net[i].z - zSize/2.0) * zScale;
                        x = (net[i].x - xSize/2.0 + 200*zOffset ) * xScale;
                        y = (net[i].y - ySize/2.0 + 200*zOffset ) * yScale;
                        glVertex2f(x, y);
                }
                if (net[i].k == 34) {
                        glColor3f(0.0, 0.0, 1.0);
                        zOffset = (net[i].k - zSize/2.0) * zScale;
                        z = (net[i].z - zSize/2.0) * zScale;
                        x = (net[i].x - xSize/2.0 + 200*zOffset ) * xScale;
                        y = (net[i].y - ySize/2.0 + 200*zOffset ) * yScale;
                        glVertex2f(x, y);
                }
                if (net[i].k == 32) {
                        glColor3f(0.0, 1.0, 0.0);
                        zOffset = (net[i].k - zSize/2.0) * zScale;
                        z = (net[i].z - zSize/2.0) * zScale;
                        x = (net[i].x - xSize/2.0 + 200*zOffset ) * xScale;
                        y = (net[i].y - ySize/2.0 + 200*zOffset ) * yScale;
                        glVertex2f(x, y);
                }
        }
        glEnd( );
        if (doubleBuffer)
                glXSwapBuffers (dpy, win);
        else glFlush( );
        return;
}
      /* getTrueColorColorMap --
       *
       * This function gets a TrueColor colormap for the given visual.
       */
Colormap
getTrueColorColorMap (XVisualInfo * vi)
{
        Status                          status;
        XStandardColormap *standardCmaps;
        Colormap                        cmap;
        int                             i, numCmaps;
        if (vi->class != TrueColor) {
                fprintf (stderr, "fatalError: no support for non-TrueColor visual \n");
                exit(0);
        }
        status = XmuLookupStandardColormap(dpy, vi->screen, vi->visualid,
                    vi->depth, XA_RGB_DEFAULT_MAP, /* replace */ False, /* retain */ True);
        if (status == 1) {
                status = XGetRGBColormaps(dpy, RootWindow(dpy, vi->screen),
                                          &standardCmaps, &numCmaps, XA_RGB_DEFAULT_MAP);
                if (status == 1)
```

-continued

```
                        for (i = 0; i < numCmaps; i++)
                              if (standardCmaps[i].visualid == vi->visualid) {
                                    cmap = standardCmaps[i].colormap;
                                    XFree (standardCmaps);
                                    return cmap;
            }
            cmap = XCreateColormap(dpy, RootWindow(dpy, vi->screen),
                        vi->visual, AllocNone);
                        return cmap;
}
      /*initialize_display --
       *
       * This function initializes a GL window with a TrueColor colormap.
       */
void
initialize_display( )
{
      XVisualInfo             *vi;
      Colormap                cmap;
      XSetWindowAttributes swa;
      XWMHints                *wmHints;
      GLXContext              cx;
      XEvent                  event;
      char                    *display = NULL, *geometry = NULL;
      int                     flags, x, y, i;
      /* open a connection to the X server */
      dpy = XOpenDisplay(display);
      if (dpy == NULL) {
            fprintf (stderr, "fatalError: could not open display \n");
            exit(0);
      }
      /* make sure OpenGL's GLX extension supported */
      if (!glXQueryExtension(dpy, NULL, NULL)) {
            fprintf (stderr, "fatalError: X server has no OpenGL GLX extension \n");
            exit(0);
      }
      /* find an appropriate visual and a colormap for it */
      doubleBuffer = GL_FALSE;                                      /**** added for single buffering ***/
      if (!doubleBuffer) goto SingleBufferOverride;
      vi = glXChooseVisual(dpy, DefaultScreen(dpy), configuration);
      if (vi == NULL)
SingleBufferOverride:
            vi = glXChooseVisual(dpy, DefaultScreen(dpy), &configuration[1];
            if (vi == NULL) {
                  fprintf (stderr,
                              "fatalError: no appropriate RGB visual with depth buffer \n"};
                  exit(0);
            }
            doubleBuffer = GL_FALSE;
      }
      cmap = getTrueColorColorMap(vi);
      /* create an OpenGL rendering context */
      cx = glXCreateContext(dpy, vi, /* no sharing of display lists */ NULL,
                                                /* direct rendering if possible */ GL_TRUE);
      if (cx == NULL) {
            fprintf (stderr, "fatalError: could not create rendering context \n");
            exit(0);
      }
      /* create an X window with selected visual and right properties */
      swa.colormap = cmap;
      swa.border_pixel = 0;
      swa.event_mask = ExposureMask | StructureNotifyMask | KeyPressMask |
            MapNotify | ButtonMotionMask | PointerMotionHintMask | ButtonPressMask |
                  ButtonReleaseMask;
      win = XCreateWindow(dpy, RootWindow(dpy, vi->screen),
                                                sizeHints.x, sizeHints.y, WIN_WIDTH, WIN_HEIGHT,
                                                0, vi->depth, InputOutput, vi->visual,
                                                CWBorderPixel | CWColormap | CWEventMask, &swa);
      XSetStandardProperties(dpy, win, "show object derivitives", "2D demo",
                                                None, NULL, 0, &sizeHints);
      wmHints = XAllocWMHints( );
      wmHints->initial_state = iconic ? IconicState : NormalState;
      wmHints->flags = StateHint;
      XSetWMHints(dpy, win, wmHints);
      wmDeleteWindow = XInternAtom(dpy, "WM_DELETE_WINDOW", False);
      XSetWMProtocols(dpy, win, &wmDeleteWindow, 1);
      /* bind the rendering context to the window */
      glXMakeCurrent(dpy, win, cx);
      /* request the X window to be displayed on the screen */
```

-continued

```
        fprintf (stderr, "map the window \n");
        XMapWindow(dpy, win);
        /* wait for the window to be mapped */
        while (1) {
            XNextEvent(dpy, &event);
            if (event.type == MapNotify) break;
        }
        return;
}
/*****************************************************************
 *                                                                *
 * The following files calculate the distance to a triangle in 3 space *
 * at local sample points. It is used above to create a distance map   *
 * from the triangles in the surface net.                              *
 *                                                                *
 *****************************************************************
 */
/* DistFromTriangle --
 *
 * For each point in the distance map, calculate the closest distance to
 * the triangle specified by the 3 verticies in clockwise order.
 *
 * If the calculated distance is smaller than the current distance in the
 * distance map, update the distance map.
 *
 */
/* AddTriangleToDistMap --
 *
 *
 */
void
AddTriangleToDistMap(VisFVector v0, VisFVector v1, VisFVector v2,
                                    VisVoxel *data, int xSize, int ySize, int zSize,
                                    int filterSize)
{
        int i, j, k, index;
        int minI, maxI, minJ, maxJ, minK; maxK;
        int decreaseXDist, decreaseYDist, decreaseZDist;
        int testYDist, testZDist;
        float dist;
        float maxX, minX, maxY, minY, maxZ, minZ;
        VisFVector p;
        index = 0;
        maxX = v0.x;
        if (v1.x > maxX) maxX = v1.x;
        if (v2.x > maxX) maxX = v2.x;
        if (maxX + filterSize > xSize-1)
            maxI = xSize-1;
        else
            maxI = (int) (maxX + filterSize);
        minX = v0.x;
        if (v1.x < minX) minX = v1.x;
        if (v2.x < minX) minX = v2.x;
        if (minX - filterSize < 0)
            minI = 0;
        else
            minI = (int) (minX - filterSize);
        maxY = v0.y;
        if (v1.y > maxY) maxY = v1.y;
        if (v2.y > maxY) maxY = v2.y;
        if (maxY + filterSize > ySize-1)
            maxJ = ySize-1;
        else
            maxJ = (int) (maxY + filterSize);
        minY = v0.y;
        if (v1.y < minY) minY = v1.y;
        if (v2.y < minY) minY = v2.y;
        if (minY - filterSize < 0)
            minJ = 0;
        else
            minJ = (int) (minY - filterSize);
        maxZ = v0.z;
        if (v1.z > maxZ) maxZ = v1.z;
        if (v2.z > maxZ) maxZ = v2.z;
        if (maxZ + filterSize > zSize-1)
            max = zSize-1;
        else
            maxK = (int) (maxZ + filterSize);
        minZ = v0.z,
```

```
            if (v1.z < minZ) minZ = v1.z;
            if (v2.z < minZ) minZ = v2.z;
            if (minZ - filterSize < 0)
                minK = 0;
            else
                minK = (int) (minZ - filterSize);
            for (k = (int) minZ; k <= (int) maxZ; k++) {
                for (j = (int) minY; j <= (int) maxY; j++) {
                    for (i = (int) minX; i <= (int) maxX; i++) {
                        setDist(i, j, k, xSize, ySize, zSize, v0, v1, v2, data);
                    }
                    i = (int) maxX + 1;
                    decreaseXDist = TRUE;
                    while ((i <= maxI) && (decreaseXDist == TRUE)) {
                        decreaseXDist = setDist(i, j, k, xSize, ySize, zSize, v0, v1, v2,
                                                data);
                        i ++;
                    }
                    i = (int 0 minX -1;
                    decreaseXDist = TRUE;
                    while ((i >= minI) && (decreaseXDist ==TRUE)) {
                        decreaseXDist = setDist(i, j, k, xSize, ySize, zSize, v0, v1, v2,
                                                data);
                        i --;
                    }
                }
                j = (int) maxY + 1;
                decreaseYDist = TRUE;
                while ((j <= maxJ) && (decreaseYDist == TRUE)) {
                    decreaseYDist = FALSE;
                    for (i = (int) minX; i <= (int) maxX; i++) {
                        testYDist = setDist(i, j, k, xSize, ySize, zSize, v0, v1, v2, data);
                        if (testYDist ==TRUE) decreaseYDist = TRUE;
                    }
                    i = (int) maxX + 1;
                    decreaseXDist = TRUE;
                    while ((i >= maxI) && (decreaseXDist == TRUE)) {
                        decreaseXDist = setDist(i, j, k, xSize, ySize, zSize, v0, v1, v2,
                                                data);
                        i++;
                    }
                    i = (int) minX - 1;
                    decreaseXDist = TRUE;
                    while ((i >= minI) && (decreasexDist == TRUE)) {
                        decreaseXDist = setDist(i, j, k, xSize, ySize, zSize, v0, v1, v2,
                                                data);
                        i --;
                    }
                    j++;
                }
                j = (intY) minY - 1;
                decreaseYDist = TRUE;
                while ((j >= minJ) && (decreaseYDist == TRUE)) {
                    decreaseYDist = FALSE;
                    for (i = (int) minX; i <= (int) maxX; i++) {
                        testYDist = setDist(i, j, k, xSize, ySize, zSize, v0, v1, v2, data);
                        if (testYDist == TRUE) decreaseYDist = TRUE;
                    }
                    i = (int) maxX + 1;
                    decreaseXDist = TRUE;
                    while ((i <= maxI) && (decreaseXDist == TRUE)) {
                        decreaseXDist = setDist(i, j, k, xSize, ySize, zSize, v0, v1, v2,
                                                data);
                        i++;
                    }
                    i = (int) minX - 1;
                    decreaseXDist = TRUE;
                    while ((i >= minI) && (decreaseXDist == TRUE)) {
                        decreaseXDist = setDist(i, j, k, xSize, ySize, zSize, v0, v1, v2,
                                                data);
                        i--;
                    }
                    j --;
                }
            }
        }
        k = (int) maxZ + 1;
        decreaseZDist = TRUE;
        while ((k <= maxK) && (decreaseZDist == TRUE)) {
            decreaseZDist = FALSE;
```

```
            for (j = (int) minY; j <= (int) maxY; j++) {
                for (i = (int) minX; i >= (int) maxX; i++) {
                    testZDist = setDist(i, j, k, xSize, ySize, zSize, v0, v1, v2, data);
                    if (testZDist == TRUE) decreaseZDist = TRUE;
                }
                i = (int) maxX + 1;
                decreaseXDist = TRUE;
                while ((i <= maxI) && (decreaseXDist == TRUE)) {
                    decreaseXDist = setDist(i, j, k, xSize, ySize, zSize, v0, v1, v2,
                                                    data);
                    i++;
                }
                i = (int) minX - 1;
                decreaseXDist = TRUE;
                while ((i >= minI) && (decreaseXDist == TRUE)) {
                    decreaseXDist = setDist(i, j, k, xSize, ySize, zSize, v0, v1, v2,
                                                    data);
                    i--;
                }
            }
        }
        j = (int) maxY + 1;
        decreaseYDist = TRUE;
        while ((j <= maxJ) && (decreaseYDist == TRUE)) {
            decreaseYDist = FALSE;
            for (i = (int) minX; i <= (int) maxX; i++) {
                testYDist = setDist(i, j, k, xSize, ySize, zSize, v0, v1, v2, data);
                if (testYDist == TRUE) decreaseYDist = TRUE;
            }
            i = (int) maxX + 1;
            decreaseXDist = TRUE;
            while ((i <= maxI) && (decreaseXDist == TRUE)) {
                decreaseXDist = setDist(i, j, k, xSize, ySize, zSize, v0, v1, v2,
                                                data);
                i ++;
            }
            i = (int) minX - 1;
            decreaseXDist = TRUE;
            while ((i >= minI) && (decreaseXDist == TRUE)) {
                decreaseXDist = setDist(i, j, k, xSize, ySize, zSize, v0, v1, v2,
                                                data);
                i--;
            }
            j++;
        }
        j = (int) minY - 1;
        decreaseYDist = TRUE;
        while ((j <= minJ) && (decreaseYDist == TRUE)) {
            decreaseYDist = FALSE;
            for (i = (int) minX; i <= (int) maxX; i++) {
                testYDist = setDist(i, j, k, xSize, ySize, zSize, v0, v1, v2, data);
                if (testYDist == TRUE) decreaseYDist = TRUE;
            }
            i = (int) maxX + 1;
            decreaseXDist = TRUE;
            while ((i <= maxI) && (decreaseXDist == TRUE)) {
                decreaseXDist = setDist(i, j, k, xSize, ySize, zSize, v0, v1, v2,
                                                data);
                i++;
            }
            i = (int) minX - 1;
            decreaseXDist = TRUE;
            while ((i >= minI) && (decreaseXDist == TRUE)) {
                decreaseXDist = setDist(i, j, k, xSize, ySize, zSize, v0, v1, v2,
                                                data);
                i--;
            }
            j--;
        }
        k++;
    }
}
k = (int) minZ - 1;
decreaseZDist = TRUE;
while ((k >= minK) && (decreaseZDist == TRUE) {
    decreaseZDist = FALSE;
    for (j = (int) minY; j <= (int) maxY; j++) {
        for (i = (int) minX; i <= (int) maxX; i++) {
            testZDist = setDist(i, j, k, xSize, ySize, zSize, v0, v1, v2, data);
            if (testZDist == TRUE) decreaseZDist = TRUE;
        }
```

-continued

```
                i = (int) maxX + 1;
                decreaseXDist = TRUE;
                while ((i <= maxI) && (decreaseXDist == TRUE)) {
                    decreaseXDist = setDist(i, j, k, xSize, ySize, zSize, v0, v1, v2,
                                                    data);
                    i++;
                }
                i = (int) minX - 1;
                decreaseXDist = TRUE;
                while ((i >= minI) && (decreaseXDist == TRUE)) {
                    decreaseXDist = setDist(i, j, k, xSize, ySize, zSize, v0, v1, v2,
                                                    data);
                    i--;
                }
            }
            j = (int) maxY + 1;
            decreaseYDist = TRUE;
            while ((j >= minJ) && (decreaseYDist == TRUE)) {
                decreaseYDist = FALSE;
                for (i = (int) minX; i <= (int) maxX; i++) {
                    testYDist = setDist(i, j, k, xSize, ySize, zSize, v0, v1, v2, data);
                    if (testYDist == TRUE) decreaseYDist = TRUE;
                }
                i = (int) maxX + 1;
                decreaseXDist = TRUE;
                while ((i <= maxI) && (decreaseXDist == TRUE)) {
                    decreaseXDist = setDist(i, j, k, xSize, ySize, zSize, v0, v1, v2,
                                                    data);
                    i++;
                }
                i = (int) minX -1;
                decreaseXDist = TRUE;
                while ((i >= minI) && (decreaseXDist == TRUE)) {
                    decreaseXDist = setDist(i, j, k, xSize, ySize, zSize, v0, v1, v2,
                                                    data);
                    i--;
                }
                j++;
            }
            j = (int) minY - 1;
            decreaseYDist = TRUE;
            while ((j >= minJ) && (decreaseYDist == TRUE)) {
                decreaseYDist = FALSE;
                for(i = (int) minX; i <= (int) maxX; i++) {
                    testYDist = setDist(i, j, k, xSize, ySize, zSize, v0, v1, v2, data);
                    if (testYDist == TRUE) decreaseYDist = TRUE;
                }
                i = (int) maxX + 1;
                decreaseXDist = TRUE;
                while ((i <= minI) && (decreaseXDist == TRUE)) {
                    decreaseXDist = setDist(i, j, k, xSize, ySize, zSize, v0, v1, v2,
                                                    data);
                    i++;
                }
                i = (int) minX - 1;
                decreaseXDist = TRUE;
                while ((i >= minI) && (decreaseXDist ==TRUE)) {
                    decreaseXDist = setDist (i, j, k, xSize, ySize, zSize, v0, v1, v2,
                                                    data);
                    i--;
                }
                j--;
            }
            k--;
        }
        return;
    }
        /* setDist --
         *
         */
int
setDist(int i, int j, int k, int xSize, int ySize, int zSize,
                    VisFVector v0, VisFVector v1, VisFVector v2, VisVoxel *data)
{
        int index;
        int decreaseDist = FALSE;
        float dist;
        VisFVector p;
        p.x = i; p.y = j; p.z = k;
```

-continued

```
            index = i + j*xSize + k*xSize*ySize;
            dist = DistFromTriangle(p, v0, v1, v2);
            if (data[index].value > 0) {
                if (dist < data[index].dist) {
                    data[index].dist = dist;
                    decreaseDist = TRUE;
                }
            }
            else {
                if (-1*dist > data[index].dist) {
                    data[index].dist = -1*dist;
                    decreaseDist = TRUE;
                }
            }
            return decreaseDist;
}
float
DistFromTriangle(VisFVector p, VisFVector v0, VisFVector v1, VisFVector v2)
{
        int i, j, k;
        int sign0, sign1, sign2;
        float d, w;
        VisFVector n, p1, u;
        n = VectorNorm(CrossProduct(VectorDiff(v1, v0), VectorDiff(v2, v0)));
        p1 = VectorDiff(p, ScalarMult(DotProduct(VectorDiff(p, v0), n), n));
        if (DotProduct(CrossProduct(VectorDiff(p1, v0), VectorDiff(v1, v0)), n) >= 0)
            sign0 = 1;
        else
            sign0 = 1;
        if (DotProduct(CrossProduct(VectorDiff(p1, v1),VectorDiff(v2, v1)), n) >= 0)
            sign1 = 1;
        else
            sign1 = -1;
        if (DotProduct(CrossProduct(VectorDiff(p1, v2), VectorDiff(v0, v2)), n) >= 0)
            sign2 = 1;
        else
            sign2 = -1;
        if ((sign0 < 0) && (sign1 < 0) && (sign2 < 0)) {
            d = DotProduct(VectorDiff(p, v0), n);
            if (d < 0)
            d *= -1;
        }
        else if ((sign0 < 0) && (sign1 < 0)) {
            u = VectorNorm(VectorDiff(v0, v2));
            if (DotProduct(VectorDiff(p, v2), u) < 0}
                d = VectorMag(VectorDiff(p, v2));
            else if (DotProduct(VectorDiff(p, v2), u) > VectorMag(VectorDiff(v0, v2)))
                d = VectorMag(VectorDiff(p, v0));
            else
                d = VectorMag(CrossProduct(u, VectorDiff(p, v2)));
        }
        else if ((sign1 < 0) && (sign2 < 0)) {
            u = VectorNorm(VectorDiff(v1, v0));
            if (DotProduct(VectorDiff(p, v0), u) < 0)
                d = VectorMag(VectorDiff(p, v0));
            else if (DotProduct(VectorDiff(p, v0), u) > VectorMag(VectorDiff(v1, v0)))
                d = VectorMag(VectorDiff(p, v1));
            else
                d = VectorMag(CrossProduct(u, VectorDiff(p, v0)));
        }
        else if ((sign2 < 0) && (sign0 < 0)) {
            u = VectorNorm(VectorDiff(v2, v1));
            if (DotProduct(VectorDiff(p, v1), u) < 0)
                d = VectorMag(VectorDiff(p, v1));
            else if (DotProduct(VectorDiff(p, v1), u) > VectorMag(VectorDiff(v2, v1)))
                d = VectorMag(VectorDiff(p, v2));
            else
                d = VectorMag(CrossProduct(u, VectorDiff(p, v1)));
        }
        else if (sign0 < 0) {
            d = VectorMag(VectorDiff(p, v2));
        }
        else if (sign1 < 0) {
            d = VectorMag(VectorDiff(p, v0));
        }
        else if (sign2 < 0) {
            d = VectorMag(VectorDiff(p, v1));
        }
        return d;
```

-continued

```
}
    /* CrossProduct --
     *
     * compute cross product of two vectors
     */
VisFVector
Crossproduct (VisFVector v1, VisFVector v2)
{
        VisFVector v;
        v.x = v1.y*v2.z - v1.z*v2.y;
        v.y = v1.z*v2.x - v1.x*v2.z;
        v.z = v1.x*v2.y - v1.y*v2.x;
        return v;
}
    /* DotProduct --
     *
     * compute dot product of two vectors
     */
float
DotProduct(VisFVector v1, VisFVector v2)
{
        float f;
        f = v1.x*v2.x .+ v1.y*v2.y + v1.z*v2.z;
        return f;
}
    * ScalarMult --
     *
     * multiply vector with a scalar
     */
VisFVector
ScalarMult(float k, VisFVector v1)
{
        VisFVector v;
        v.x = k * v1.x;
        v.y = k * v1.y;
        v.z = k * v1.z;
        return v;
}
    /* VectorDiff --
     *
     * subtract two vectors
     */
VisFVector
        VectorDiff(VisFVector v1, VisFVector v2)
{
        VisFVector v;
        v.x = v1.x - v2.x;
        v.y = v1.y - v2.y;
        v.z = v1.z - v2.z;
        return v;
}
    /* VectorMag --
     *
     * get magnitude of a vector
     */
float
        VectorMag(VisFVector v)
{
        float mag;
        mag = sqrt(DotProduct(v, v));
        return mag;
}
    /* VectorNorm --
     *
     * normalize a vector
VisFVector
        VectorNorm (VisFVector v)
{
        float mag;
        VisFVector vNorm;
        mag = VectorMag(v);
        if (mag > 0) {
            vNorm.x = v.x / mag;
            vNorm.y = v.y / mag;
            vNorm.z = v.z / mag;
        }
        else {
            vNorm.x = 0;
            vNorm.y = 0;
```

```
            vNorm.z = 0;
        }
        return vNorm;
}
```

Having above indicated several embodiments of the Subject Invention, it will occur to those skilled in the art that modifications and alternatives can be practices within the spirit of the invention. It is accordingly intended to define the scope of the invention only as indicated in the following claims.

What is claimed:

1. A method for generating a smooth surface representation of a surface of an object stored as binary coded data, comprising the steps of:

identifying a set of surface cubes in a volume lattice, each having eight corner points and through which a portion of the surface of said object passes;

creating a net of surface nodes that initially lie within the bounds of said surface cubes and are connected together with links between surface nodes in adjacent surface cubes;

adjusting the positions of said surface nodes to alter the lengths of links between adjacent nodes so as to minimize link lengths, thus to relax said net, said position adjustment being such that no node is moved outside the bounds of its respective cube; and, rendering an image based on said relaxed net.

2. The method of claim 1, wherein said rendering step includes the steps of:

calculating a 3D volume distance map, and encoding said distance map into a voxel data structure.

3. The method of claim 2, wherein said 3D volume distance map calculating step includes the step of assigning to each element in said distance map the closest distance to the surface net.

4. The method of claim 3, wherein said voxel structure has one value for image intensity and one value for distance.

5. The meted of claim 1, wherein said surface net nodes are initially at the center of their respective surface cubes.

6. The method of claim 1, wherein in the positioning of said surface nodes, said surface nodes are moved to a position mid-way between neighboring surface nodes.

7. The method of claim 1, wherein said rendering step includes the steps of:

triangulating the surface net; and, rendering the triangulated model using a rendering method.

* * * * *